Figure 1:
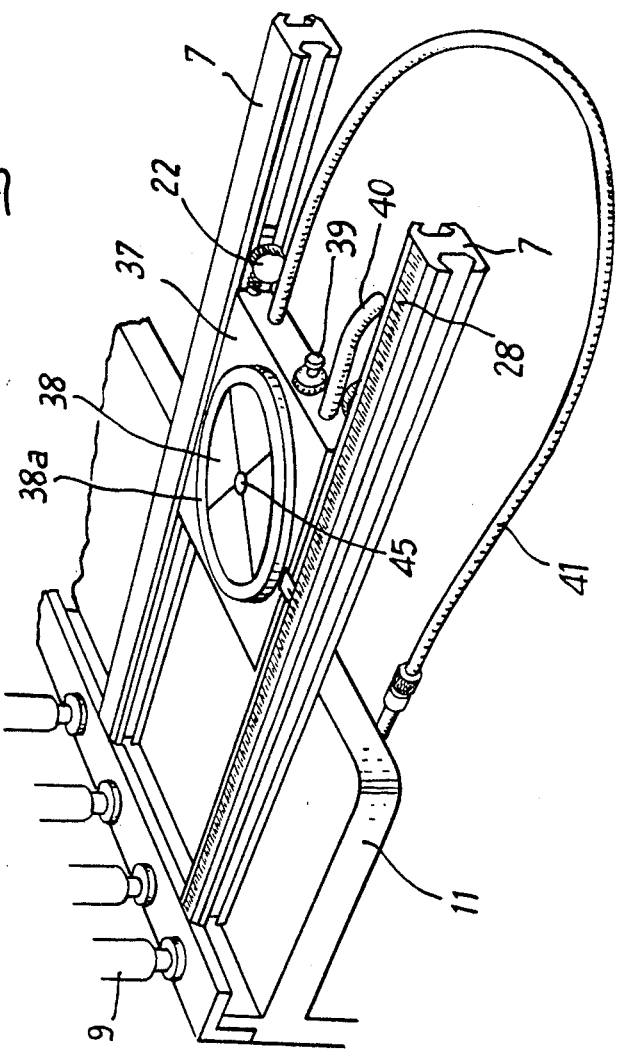

United States Patent

[11] 3,592,095

| [72] | Inventors | Rene Passa<br>Livry-Gargan;<br>Achille Romoli, St-Remy Saint-Denis, both of, France |
|---|---|---|
| [21] | Appl. No. | 814,593 |
| [22] | Filed | Apr. 9, 1969 |
| [45] | Patented | July 13, 1971 |
| [73] | Assignee | Ste. B.R.G., rue Pasteur-Devil<br>La Barre, France |
| [32] | Priority | Apr. 17, 1968 |
| [33] | | France |
| [31] | | 148,326 |

[54] SHEARS AND THE LIKE APPARATUS FOR CUTTING SHEET MATERIAL
9 Claims, 3 Drawing Figs.

| [52] | U.S. Cl. | 83/267,<br>83/410, 269/21, 83/451, 269/57 |
|---|---|---|
| [51] | Int. Cl. | B26d 5/20 |
| [50] | Field of Search | 83/267,<br>410, 411, 451; 269/21, 57 |

[56] References Cited
UNITED STATES PATENTS

| 2,956,464 | 10/1960 | Charron | 83/267 X |
|---|---|---|---|
| 3,267,788 | 8/1966 | Giordano | 83/267 UX |

Primary Examiner—William S. Lawson
Attorney—Michael S. Striker

ABSTRACT: The shears are of the type including a centering carriage adapted to cut circular blanks out of a metal sheet, said carriage being slidingly fitted and held between two guiding rails in any desired longitudinal position and being provided with a rotary plate or the like means over which the metal sheet may rest to be shifted angularly by predetermined amounts to allow a succession of cuts to be executed along the desired circular line of cut, a jack associated with the jacks controlling the shearing blades providing in antagonism with a spring for the intermittent progression of the rotary plate through the agency of a ratchet wheel.

PATENTED JUL 13 1971

3,592,095

INVENTORS:
RENE PASSA
ACHILLE ROMOLI

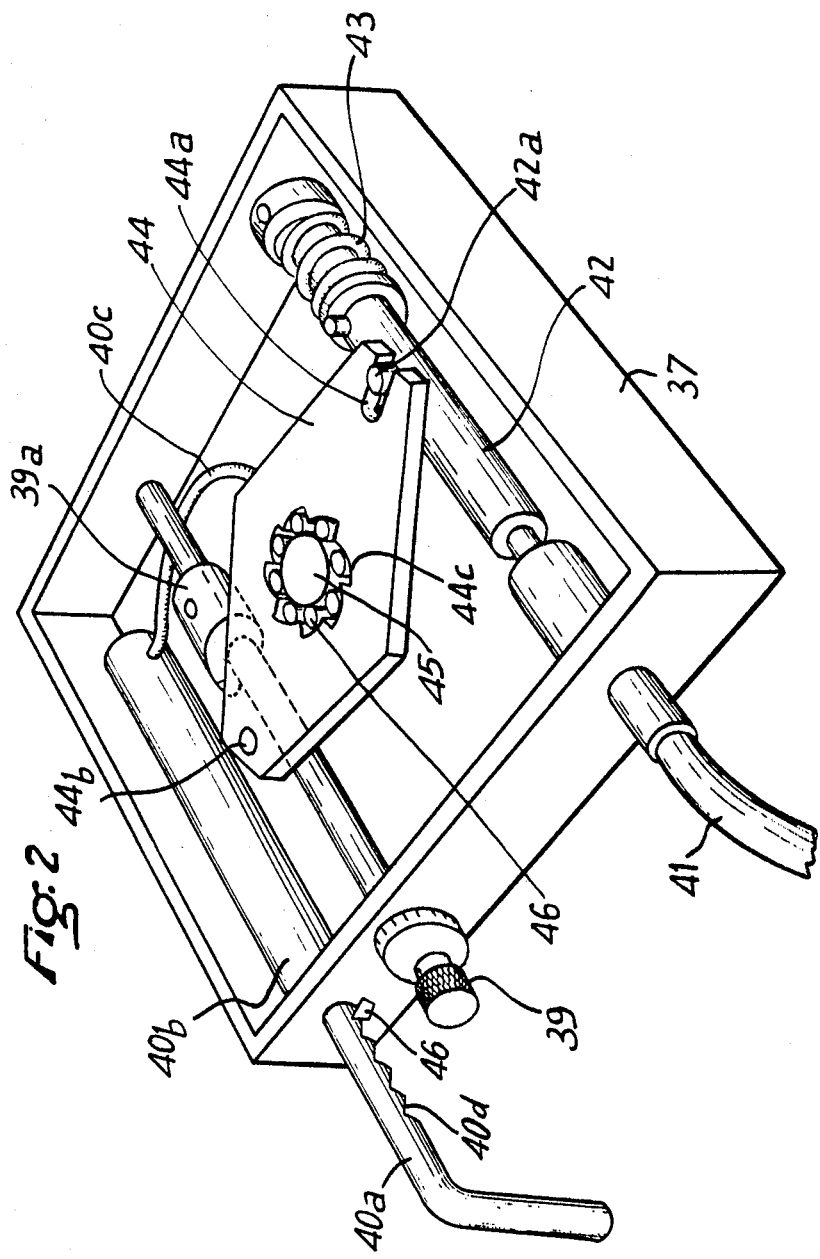
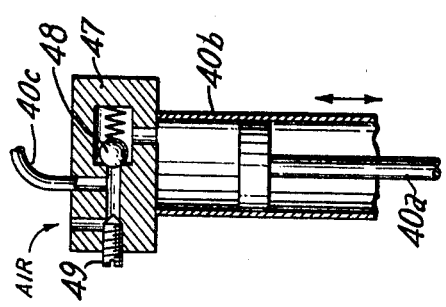

SHEARS AND THE LIKE APPARATUS FOR CUTTING SHEET MATERIAL

In the prior U.S. Pat. No. 3,267,788 filed in the name of Roger Francois Giordano, there is described an apparatus for cutting sheet material such as shears incorporating stops located ahead of the latter and to the rear of the sheet to be cut, said stops being subjected to the action of prestressing means carried by the work-carring table through the agency of a rail, the stop-carrying means being adapted to serve as a carriage provided with centering means whereby circular blanks may be cut out of the sheet.

Our present invention has for its object an improvement to such shears according to which the centering carriage provided for the cutting of circular blanks is located between two guiding rails and held fast by two prestressed stops, said centering carriage carrying means for angularly shifting the metal sheet associated with the means controlling the shears, the angular shifting being adjustable.

Our invention covers furthermore the following optional features:

the centering means are provided with an upstanding rubber edge which allows the metal sheet to be held fast through suction while said plate is angularly shifted by a spring through the agency of a free wheel, said spring being stretched by a hydraulic jack operatively connected with the hydraulic circuit controlling the shears, the stroke of the spring being limited by an adjustable stop while the free wheel includes two lateral projections the end of one of which is slotted so as to engage a stud rigid with the movable section of the jack. Said jack which is of the single-acting type stretches the spring extending along the axis of the jack and controls the free wheel while the latter is disconnected, said jack being urged back into its inoperative position by the spring and shifting thereby angularly the plate on the centering carriage. The corresponding adjustable stop is constituted by a cylindrical part carried by a rotary shaft and provided with a lateral cam or slope lying across the path of a stud rigid with the end of the other projection of the rotary plate, the movement of which is adjustably limited as provided by a rotation of said stop controlled by external means.

The vacuum required for holding the metal sheet in position is obtained by a manually controlled vacuum pump secured to the centering carriage and constituted by a cylinder rigid with the rotary plate and a fluidtight piston connected with an external handle. Vacuum is maintained by locking the piston rod in its drawn out position or else by means of a nonreturn flap valve inserted between the vacuum pump and the rotary plate, a cock being provided furthermore with a view to controlling the input of air.

By way of example and for furthering the understanding of the following description, there is illustrated in the accompanying drawings:

FIG. 1 a diagrammatic perspective view of our improved arrangement;

FIG. 2 a more detailed perspective view of the means controlling the rotary plate in said arrangement; and FIG. 3 a valve arrangement between the vacuum pump and the rotary plate.

Turning to the drawings, it is apparent that the centering carriage 37 which is in the shape of a hollow parallelepiped is carried between two guiding rails 7 secured to the work-carrying bed 11 of the shears. A scale 28 allows an easy adjustment of the spacing between the centering carriage 37 and the line of cut. Prestressed stops 22 are provided as in the case of the above-mentioned patent so as to allow a micrometric adjustment of the location of the centering carriage 37 which latter is provided with a rotary plate 38 associated with a raised peripheral rubber edge 38a. The spindle 45 carrying the rotary plate is hollow and forms a fluidtight connection through the pipe 40c with a vacuum pump including a cylinder 40b and a piston the rod 40a of which terminates with a handle.

The rotary plate 38 is adapted to be angularly shifted by a free wheel system constituted by rollers 46 engaging slopes 44c formed along the inner periphery of a driving plate 44 carrying two lateral projections as illustrated in FIG. 2 one of said lateral projections is slotted at 44a for engagement with a stud 42a rigid with a jack 42. The end of the other projection on the plate 44 carries a stud 44b cooperating with a stop 39a constituted by a rotary helical slope. Consequently, a rotation of the knob 39 coaxially rigid with said stop 39a shifts the stop 44b and modifies consequently the maximum angular setting of the plate 44, which setting is defined by the position of said stop 39a. As apparent from inspection of the drawings, the jack 42 controls the return stroke of the driving plate 44 while it compresses the spring 43, since the channel feeding fluid into said jack 42 is connected with the hydraulic circuit controlling the shears that is the hydraulic circuit feeding the sheet-clamping jacks 9, the return stroke of the driving plate is obtained when the shears are in their cutting stage the free wheel being disconnected. When the sheet-clamping jacks 9 are released, the spring 43 urges the jack back into its original position and causes the driving plate 44 to revolve until the stud 44b engages the stop 39a while it causes simultaneously the spindle 45 to rotate with the rotary plate 38. According to the thickness of the metal sheet to be cut, the blank is centered either solely under the action of the suction produced by the vacuum pump 40 or else by means of a bolt screwed into the spindle 45 and extending through the sheet to be cut.

The stop 39a provides an adjustment of the angular shifting between 1° and 10°, the usual lead being equal to 3°. With such a lead it is possible to obtain a circular cut of a diameter of 1 m. in less than 2 min. in a metal sheet of a thickness of 10 mm. the grade of cut being far better than that of a nippling machine as used generally or of a cutting by a blow pipe.

A further advantage resides in the fact that the arrangement requires no outer supply of energy. As a matter of fact, a mere tapping is required on the pipe feeding the shears and high-speed double-closing members provide a connection with the means controlling the stepped angular shifting. Such a single connection provides both driving energy and synchronization. Consequently, it is possible for the user to insert and remove the rotary plate without any difficulty.

The centering through vacuum for thin metal sheets is a further important advantage since the necessity of perforating centrally the circular blank to be obtained is often objectionable chiefly if it is desired to refill later on by welding the perforation obtained, which may be difficult matter in the case of thin metal sheets.

The means for maintaining vacuum may obtained either by a nonreturn valve 47 including a spring-pressed ball 48 inserted between the pump 40 and rotary plate 38 and associated with a cock 49 for the input of air or again by one or a plurality of notches provided on the handle 40a of the pump 40 and cooperating with a catch on the carriage 37 to hold the piston rod in its drawn out position, if the vacuum produced by an outward movement of the pump is sufficient.

What we claim is:

1. In a shears for cutting circular blanks out of sheet material, a combination comprising elongated guide means; a centering carriage carried by said guide means movable in longitudinal direction thereof; means for securing said centering carriage in any desired position along said guide means; removable means carried by said carriage turnable about an axis; means cooperating with said revolvable means for holding a sheet to be cut thereon for turning movement therewith about said axis; drive means for angularly turning said revolvable means about said axis through increments in sequence with the movement of the shear blades and adjusting means cooperating with said drive means for adjusting said increments of turning.

2. A combination as defined in claim 1, wherein said revolvable means comprise a plate carried by said carriage turnable about said axis, and wherein said drive means comprise free wheel means coaxial with said plate, a single-acting hydraulic jack connected to said free wheel means for turning the same in one direction, and a spring stressed by said jack when operative and to return said jack and free wheel means into their starting position to cause said free wheel means to shift said rotary plate by one step.

3. A combination as defined in claim 2, and including adjustable stop means for limiting turning of said free wheel means by said spring.

4. A combination as defined in claim 2, wherein said free wheel means comprises a driving plate having two radial projections, and means tiltably connecting one of said projections with said jack.

5. A combination as defined in claim 4, and including a stud projecting from the other of said projections, a cylindrical stop provided with a transverse slope extending into the path of movement of said stud, and manually operable means controlling the angular position of said cylindrical stop to thereby adjust the angular movement of said driving plate under the influence of said spring.

6. A combination as defined in claim 1, wherein said revolvable means comprises a plate carried by said carriage turnably about said axis, and wherein said means for holding the sheet comprises a raised rubber edge on said plate adapted to carry the sheet to be cut, and means for exerting a suction action beneath the sheet resting on said rubber edge.

7. A combination as defined in claim 6, wherein said means for exerting said suction action comprise a vacuum pump including a cylinder carried by said carriage, a piston in said cylinder, a piston rod rigid with said piston and having a handle portion projecting beyond said carriage, and conduit means connecting the interior of said cylinder with a portion of said plate within said rubber edge.

8. A combination as defined in claim 7, and including means for locking said piston rod in its drawnout position.

9. A combination as defined in claim 7, and including a one-way valve between said vacuum pump and said plate and a cock adapted to provide connection between said conduit means and the outer atmosphere.